Aug. 6, 1940.   J. P. BLACK   2,209,946
LAWN EDGING PLOW AND TRIMMER
Filed Oct. 12, 1938   2 Sheets-Sheet 1

Inventor
J. P. Black.
By Lacey & Lacey,
Attorneys

Aug. 6, 1940.　　　　J. P. BLACK　　　　2,209,946
LAWN EDGING PLOW AND TRIMMER
Filed Oct. 12, 1938　　　　2 Sheets-Sheet 2
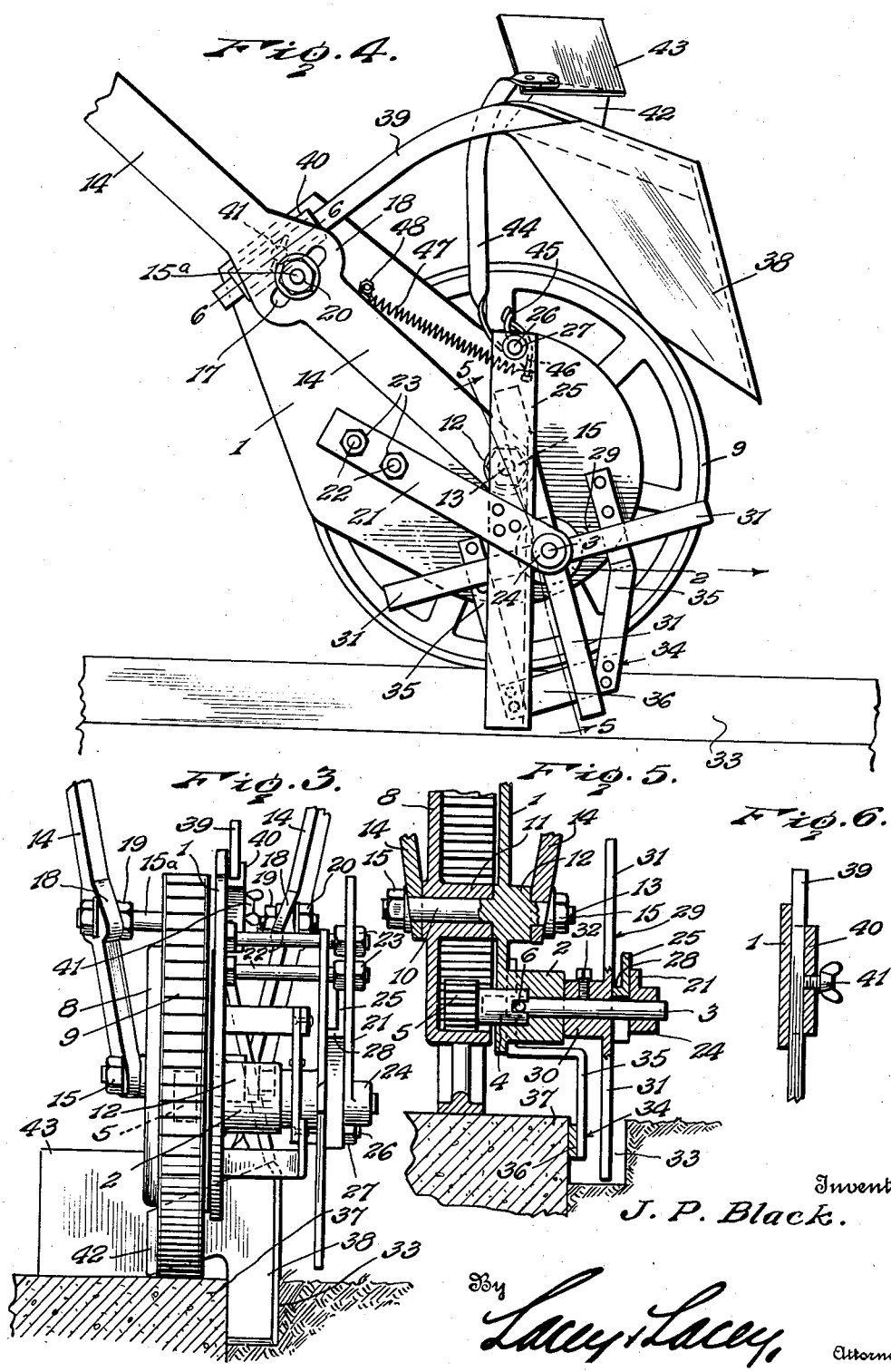
Inventor
J. P. Black.
By Lacey & Lacey,
Attorneys Patented Aug. 6, 1940

2,209,946

UNITED STATES PATENT OFFICE 2,209,946

LAWN EDGING PLOW AND TRIMMER

John P. Black, Amarillo, Tex.

Application October 12, 1938, Serial No. 234,676

3 Claims. (Cl. 97—227)

This invention relates to a lawn ditcher and trimmer, and it is one object of the invention to provide a device of this character so constructed that it may be employed for forming a ditch along borders of a lawn and then employed for clipping the grass along one side of the ditch. It will thus be seen that the same implement may be used for both digging a ditch along a border of a lawn and for clipping the grass along the inner margin of the ditch and eliminates the necessity of using separate implements for the two operations.

Another object of the invention is to provide an implement of this character so constructed that it may be pushed along a sidewalk or cement path very similar to the manner in which a grass cutter is propelled across a lawn and a ditch dug along the side edge of the path or sidewalk or grass clipped along a margin of a ditch which has previously been dug.

Another object of the invention is to provide an implement wherein the ditching plow may be adjusted in order to dig a ditch of a predetermined depth and in addition so form the plow that during a ditching operation dirt will be lifted and deposited upon the path or sidewalk where it can be very easily removed after the ditch has been dug.

Another object of the invention is to so form and mount the clipping means that a shaft carrying a rotary blade may have rotary motion imparted to it from the wheel which rests upon the sidewalk or path and constitutes a traction wheel of the implement.

Figure 1:
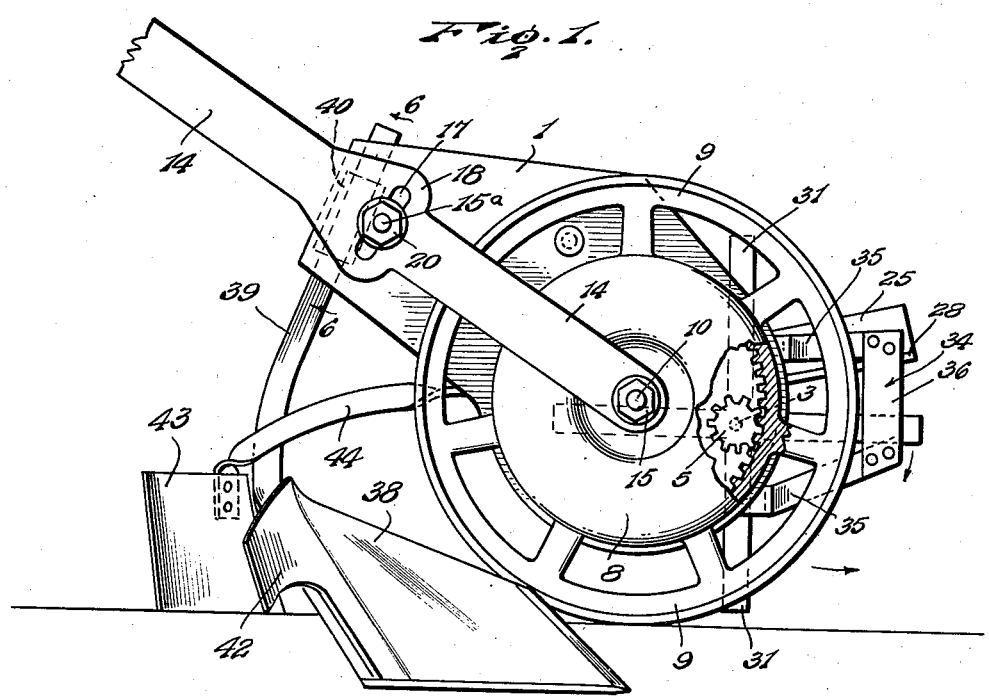
Figure 2:
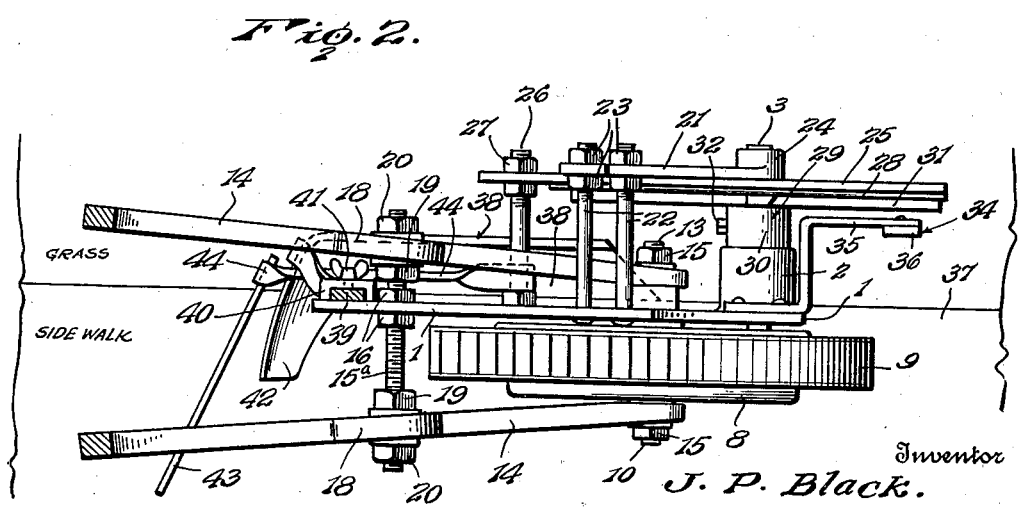

The invention is illustrated in the accompanying drawings, wherein:

Figure 1 is a side elevation of the improved implement showing the same in position for use as a trench digger, Figure 2 is a top plan view of the implement, Figure 3 is a view looking at the implement from the front, Figure 4 is a side elevation looking at the implement from the opposite side of Figure 1 and showing it in position for use as a grass clipper, Figure 5 is a sectional view taken along the line 5—5 of Figure 4, and Figure 6 is a fragmentary sectional view taken along the line 6—6 of Figure 1 or Figure 4.

This improved lawn ditching and trimming implement has a frame including as one of its elements a plate 1 which is formed of thick sheet metal. A bearing 2 extends from one side of the plate 1 adjacent the forward end thereof, and from an inspection of Figure 5, it will be seen that through this bearing is journaled a shaft 3 having one end secured in the shank 4 of a small gear or pinion 5 by a set screw or equivalent fastener 6. The pinion 5 is disposed within a large gear 8 carried by a traction wheel 9 concentric thereto, and when the traction wheel is turned about the shaft or axle 10 projecting from one side of the plate 1 through the hub 11 of the traction wheel, rotary motion will be transmitted to the shaft 3. Opposite the shaft 10, the plate 1 carries a boss 12 from which extends a shaft or stem 13, and upon this stem 13 and the outer end portion of the shaft 10 are engaged the forward ends of a pair of handles 14 held in place by nuts 15. By so mounting the forward ends of the handles, they may be vertically adjusted, and in order to secure the handles in vertically adjusted position, there has been provided a rod or threaded stem 15ª which is secured through the rear end portion of the plate 1 by nuts 16 and passes through the slots 17 formed transversely of the handles through widened portions 18 thereof. Other nuts 19 and 20 are carried by the threaded rod 15ª for engaging opposite side faces of the handles and firmly securing the handles after they have been swung vertically to an adjusted position. It should also be noted that this construction permits the handles to be swung laterally and secured in adjusted position which will dispose their rear ends in such spaced relation to each other that they may be conveniently grasped by the operator of the implement. The side bar 21 of the frame is mounted upon outer end portions of rods or stems 22 carried by and extending laterally from the plate 1, and in order to firmly secure this side bar upon the stems, it is engaged at opposite side faces by nuts 23 threaded upon the stems. An outwardly extending boss 24 constituting a bearing is formed adjacent the forward end of the side bar 21 to rotatably receive the outer end portion of the shaft 3, and against the inner face of the forward end portion of the side bar is riveted or otherwise firmly secured a stationary cutter bar 25 which has its rear end portion engaged with the outer end of a stem or threaded rod 26 carried by and projecting laterally from the plate 1. This stem also carries nuts 27 for engaging opposite side faces of the cutter bar and firmly securing this cutter so that it will be gripped and held stationary. An inwardly extending flange 28 is formed along one side edge of the cutter bar, and this flange is ground to provide a sharp cutting edge. A rotary cutter 29 having a hub 30 and radiating blades 31 is mounted upon the shaft 3 between the boss 2 and the stationary cutting blade 25, and since the blades 31 are sharpened and move across the sharpened edge of the blade 25 during turning of the rotary cutter with the shaft 3, a good shearing action will take place for clipping grass during a trimming operation. A set screw 32 is employed to securely but removably hold the hub of the rotary cutter fast upon the shaft 3, and since the hub of this rotary cutter has abutting engagement with the outer end of the boss 2, longitudinal shifting movement of the shaft 3 will be prevented. The stationary blade and the blades of the rotary cutter must be properly disposed within the trench 33 during a trimming operation, and in order to do so, there has been provided a guide 34 having arms 35 which are riveted or otherwise secured against the forward end portion of the plate 1. These arms are bent laterally, as shown in Figure 5, so that the bridge or cross bar 36 of the guide will be spaced the desired distance from the wheel 9, and upon referring to this figure, it will be seen that during use of the implement as a trimmer the guide will extend downwardly into the trench and the cross bar or bridge 36 have contacting engagement with a side face of the sidewalk or cement path 37. This will cause the implement to be guided as it is pushed forwardly and the blades held in such position in the trench or gutter 33 that grass projecting from the lawn will be evenly trimmed. The plow blade 38 is disposed rearwardly of the wheel 9 and is provided with a shank 39 which extends upwardly from the blade and across the rear end portion of the plate 1. The shank which is rectangular in cross section, as shown in Figure 2, passes through a mounting sleeve 40 carried by and extending transversely of the plate 1, and the sleeve carries a set screw 41 for engaging the shank and firmly securing the plow blades in a vertically adjusted position. It will thus be seen that the plow blade may be vertically adjusted and a trench or gutter 33 of the desired depth dug when the implement is pushed forwardly along the sidewalk or pathway with the plow blade in position to dig a trench, as shown in Figures 1 and 3. A moldboard 42 extends laterally from the rear end portion of the plow blade 38, and back of this moldboard in cooperating relation thereto is disposed a scraper 43 carried by an arm or metal strip 44 which projects forwardly from the scraper and at its front end is bent about the rod 26 to pivotally mount the arm so that the scraper blade may be shifted vertically as the plow blade digs the ditch or gutter. It will thus be seen that the scraper blade may at all times rest upon the cement walk or path 37 in position to engage the dirt delivered from the moldboard. The scraper may carry the dirt forwardly and at intervals be raised in order to form piles of dirt. The forward end of the metal strip or arm 44, which is bent to fit loosely about the rod 26, terminates in a lip 45 carrying a pin 46, and this pin is engaged by one end of a spring 47 which extends rearwardly therefrom and at its other end is engaged with a pin 48 carried by the plate. This spring exerts pull upon the pin 46 to swing the arm 44 and the scraper blade downwardly and thus maintain the blade in scraping engagement with the sidewalk or pathway. It will thus be seen that the scraping blade will be maintained in proper engagement with the pathway or sidewalk and the dirt delivered by the plow across its moldboard will be properly scraped along the path or sidewalk and formed into piles when the scraper is shifted upwardly at proper intervals and then allowed to return to its lowered position by pull of the spring.

When this implement is in use for forming a ditch or gutter about the borders of a lawn along margins of a path or sidewalk, it is disposed as shown in Figure 1 and pushed forwardly by grasping the handles. As the implement is moved forwardly, the plow blade 38 will enter the ground to form a ditch or trench, as shown in Figure 3, and dirt removed by the plow blade will be delivered across the mold board 42 onto the path or sidewalk in front of the scraper which is held in contacting engagement with the upper face of the sidewalk or path by the spring 47. This dirt will be moved forwardly by the scraper and at intervals the scraper may be lifted in order to leave the dirt in piles or the scraper blade may be left in engagement with the sidewalk or path and merely serve to shift the dirt partially across the path or sidewalk where it will be out of the way of the person walking behind the implement and pushing the implement forwardly. The plow blade may be set to form a ditch or trench of the desired depth during one operation of the implement or it may be first set to dig a trench or ditch which is quite shallow and then progressively shifted downwardly during subsequent operations until a ditch or trench of the desired depth has been dug. After a ditch or trench of the desired depth has been dug, the implement is turned to the position shown in Figure 4 and then pushed forwardly along the sidewalk or path with the stationary cutter bar or blade extending into the ditch, as shown in Figure 5, and the guard 34 extending into the ditch with its bridge 36 in engagement with the side face of the path or sidewalk, as shown in Figure 5. During forward movement of the implement, the shaft 3 has rotary motion transmitted to it from the gear 8, and since the rotary cutter 29 turns with the shaft 3, the radiating blades 31 of the rotary cutter will be moved across the lower portion of the stationary cutter blade in slicing or shearing engagement therewith. Any grass protruding from the lawn into or across the ditch or gutter will be engaged between the stationary blade and the blades of the rotary cutter and clipped. In view of the fact that the guard 34 is held in engagement with the side face of the path or sidewalk, the grass will be evenly clipped and a neat appearance imparted to the lawn. It will, of course, be understood that after a ditch or trench has once been formed subsequent clipping operations may be performed to trim the edges of the lawn along the ditch or gutter without first employing the ditching portion of the implement. In case the ditch or gutter becomes gradually filled by dirt washed into the same from the lawn during heavy rains, the plow may be brought into use and the ditch deepened as much as necessary.

Having thus described the invention, what is claimed as new is:

1. An implement of the character described comprising a frame, a traction wheel for said frame, a plow blade disposed rearwardly of and to one side of said wheel and having a laterally extending moldboard, a scraper disposed rearwardly of said plow blade and extending laterally thereof beyond the moldboard, said scraper being mounted for vertical movement, and means for yieldably resisting upward movement of the scraper, said scraper being operable for shifting dirt, passing from the moldboard, along with the implement as said implement moves along.

2. An implement of the character described comprising a frame including a side plate, a shaft carried by said side plate and having portions projecting from opposite sides thereof, a traction wheel rotatably mounted upon said shaft, handles having their forward ends mounted upon end portions of said shaft, a rod carried by and projecting from opposite sides of the rear portion of said plate with its ends extending through said handles, securing members for said handles carried by said rod, a plow blade disposed rearwardly of and to one side of said traction wheel, a shank for said plow blade extending upwardly therefrom, a sleeve carried by said plate with the shank extending through the same, and securing means for said shank to releasably hold the shank in a vertically adjusted position and maintain the plow blade in position to dig a trench of predetermined depth when the implement is pushed forwardly with the traction wheel resting upon a path adjacent a side edge thereof and the plow blade in position to dig a ditch along margins of a lawn at a side of the path.

3. An implement of the character described comprising a frame having a side plate, a traction wheel rotatably mounted at one side of said plate, handles extending rearwardly from said frame, a plow blade disposed rearwardly of and to one side of said traction wheel, a shank for said plow blade, means carried by said plate for engaging said shank and securing the plow blade in a vertically adjusted position, a stem extending from said plate at the opposite side thereof from said wheel, a scraper blade disposed rearwardly of said plow blade, an arm for said blade extending forwardly and loosely engaged about said stem to mount the arm and scraper blade for vertical swinging movement, and a spring connected with said arm and yieldably resisting upward movement of the arm and the scraper blade, said scraper being operable for shifting dirt, passing from the moldboard, along with the implement.

JOHN P. BLACK.